United States Patent
Belotserkovsky et al.

(10) Patent No.: US 7,227,835 B2
(45) Date of Patent: Jun. 5, 2007

(54) METHOD AND APPARATUS FOR ADJACENT CHANNEL INTERFERENCE REDUCTION IN AN ORTHOGONAL FREQUENCY DIVISION MULTIPLEXING (OFDM) RECEIVER

(75) Inventors: Maxim B. Belotserkovsky, Indianapolis, IN (US); Louis Robert Litwin, Jr., Plainsboro, NJ (US)

(73) Assignee: Thomson Licensing, Boulogne, Billancourt (FR)

( * ) Notice: Subject to any disclaimer, the term of this patent is extended or adjusted under 35 U.S.C. 154(b) by 986 days.

(21) Appl. No.: 10/185,572

(22) Filed: Jun. 27, 2002

(65) Prior Publication Data

US 2004/0001427 A1 Jan. 1, 2004

(51) Int. Cl.
*H04J 11/00* (2006.01)
(52) U.S. Cl. ...................... 370/208; 370/210
(58) Field of Classification Search ............... 370/203, 370/208, 210
See application file for complete search history.

(56) References Cited

U.S. PATENT DOCUMENTS

| | | | |
|---|---|---|---|
| 4,884,139 A | 11/1989 | Pommier | |
| 5,488,632 A | 1/1996 | Mason et al. | |
| 5,784,170 A | 7/1998 | Park et al. | |
| 5,970,397 A | 10/1999 | Klank et al. | |
| 6,445,693 B1 | 9/2002 | Sarraf et al. | 370/343 |
| 6,603,734 B1 | 8/2003 | Oksanen | 370/203 |

| | | | |
|---|---|---|---|
| 2004/0032854 A1* | 2/2004 | Huang et al. | 370/350 |

OTHER PUBLICATIONS

International Search Report, PCT/US03/19909, dated Oct. 2003.*
Ahmad Chini, et al., Hardware Nonlinearities In Digital TV Broadcasting Using OFDM Modulation, IEEE Transactions On Broadcasting, vol. 44, No. 1, Mar. 1998, pp. 12-21.
Lei Wei, et al., Synchronization Requirements for Multi-user OFDM on Satellite Mobile and Two-path Rayleigh Fading Channels, IEEE Transactions On Communication, vol. 43, No. 2/3/4, Feb./Mar./Apr. 1995, pp. 887-895.
John A.C. Bingham, Multicarrier Modulation for Data Transmission: An Idea Whose Time Has Come, IEEE Communications Magazine, May 1990, pp. 5-14.
John M. Cioffi, A Multicarrier Primer.
Qun Shi, OFDM In Bandpass Nonlinearity, IEEE Transactions on Consumer Electronics, vol. 42. No. 3, Aug. 1996, pp. 253-258.
S. Andreoli, HPA Non Linear Distortions in DVB-T Systems Simulation and Measurement, 1998 URSI International Symposium on Signals, Systems, and Electronics. Conference Proceedings, pp. 124-127.

(Continued)

*Primary Examiner*—Melvin Marcelo
(74) *Attorney, Agent, or Firm*—Joseph J. Laks; Vincent E. Duffy; Michael A. Pugel (57) ABSTRACT

The disclosed embodiments relate to reducing adjacent channel interference in an OFDM receiver. An error metric is monitored and the carrier frequency of the desired channel is slowly adjusted in response to the error metric. In this manner, the received OFDM signal, including the desired signal corrupted by the adjacent interfering channel, may be shifted until the zero crossings of the adjacent channel line up with the FFT bins. A multi-tap equalizer may then be used to remove the inter-bin interference that results from the frequency offset in the desired channel.

20 Claims, 5 Drawing Sheets

OTHER PUBLICATIONS

Torsten C. Becker, A New Network Planning Approach for Digital Audio Broadcasting, IEEE Transactions On Vehicular Technology, vol. 48, No. 2, Mar. 1999, pp. 619-626.

Robert W. Lowdermilk, et al., Design and Performance of Fading Insensitive Orthogonal Frequency Division Multiplexing (OFDM) using Polyphase Filtering Techniques, Conference Record of The Thirtieth Asilomar Conference on Signals, Systems & Computers, Nov. 3-6, 1996, pp. 674-678.

Mohammed El-Tanany, et al., Impact of Adjacent Channel Interference on the Performance of OFDM Systems over Frequency Selective Channels, 48th IEEE Vehicular Technology Conference Westin Hotel, Ottawa, Canada, May 18-21, 1998, pp. 2241-2245.

Lei Wei, et al. Requirements of Timing And Frequency Synchronizations For Multi-user OFDM On Satellite Mobile Channel, 1994 IEEE Globecom, San Francisco, Nov. 28-Dec. 2, 1994. pp. 735-739.

Mikael Gudmundson, Adjacent Channel Interference In An OFDM System, 1996 IEEE 46th Vehicular Technology Conference, Atlanta, Georgia, USA, Apr. 28-May 1, 1996, pp. 918-922.

Author: Nobuyuki Kataoka & Ryuji Kohno, Title: Adaptive Equalizer Including Frequency-Offset Compensator for Multi-Carrier Communications Systems, Date: Sep. 1998, Published by: The Division of Electrical and Computer Engineering, Yokohama National University, Yokohama Japan, pp. 1076-1080.

* cited by examiner

METHOD AND APPARATUS FOR ADJACENT CHANNEL INTERFERENCE REDUCTION IN AN ORTHOGONAL FREQUENCY DIVISION MULTIPLEXING (OFDM) RECEIVER

FIELD OF THE INVENTION

The present invention relates to processing orthogonal frequency division multiplexed (OFDM) signals.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A wireless LAN (WLAN) is a flexible data communications system implemented as an alternative or extension to a wired LAN within a building or campus. Using electromagnetic waves, WLANs transmit and receive data over the air, minimizing the need for wired connections. Thus, WLANs combine data connectivity with user mobility, and, through simplified configuration, enable movable LANs. Some industries that have benefited from the productivity gains of using portable terminals (e.g., notebook computers) to transmit and receive real-time information are the digital home networking, health-care, retail, manufacturing, and warehousing industries.

Manufacturers of WLANs have a range of transmission technologies to choose from when designing a WLAN. Some exemplary technologies are multicarrier systems, spread spectrum systems, narrowband systems, and infrared systems. Although each system has its own benefits and detriments, one particular type of multicarrier transmission system, orthogonal frequency division multiplexing (OFDM), has proven to be exceptionally useful for WLAN communications.

OFDM is a robust technique for efficiently transmitting data over a channel. The technique uses a plurality of sub-carrier frequencies (sub-carriers) within a channel bandwidth to transmit data. These sub-carriers are arranged for optimal bandwidth efficiency compared to conventional frequency division multiplexing (FDM) which can waste portions of the channel bandwidth in order to separate and isolate the sub-carrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier.

The transmission of data through a channel via OFDM signals also provides several other advantages over more conventional transmission techniques. Some of these advantages are a tolerance to multipath delay spread and frequency selective fading, efficient spectrum usage, simplified sub-channel equalization, and good interference properties.

In spite of these advantages, there are some problems with OFDM data transfer in systems that are adapted to process multiple signals from multiple users. One example of such a problem is adjacent channel interference (sometimes referred to as interchannel interference). One of the main reasons for adjacent channel interference is the windowing that occurs as an inherent part of the Fast Fourier Transform (FFT) processing of signals that is typical of all OFDM receivers. In processing signals using FFT algorithms, the tone of each OFDM sub-band may be spread across multiple FFT bins with periodically spaced zero crossings (e.g. a sinc function in the case of a rectangular window) in the frequency domain. Such a frequency domain structure allows adjacent channels to be placed at the multiples of the sampling rate with no adjacent channel interference because of the alignment of the zero crossing. Thus, even though the energy from an adjacent channel in the frequency range for the desired channel is non-zero, there is no adjacent channel interference because of the orthogonal nature of the two signals.

However, when a carrier frequency offset is present, the orthogonality between adjacent channel signals is not maintained and adjacent channel interference occurs. A method of reducing adjacent channel interference in OFDM receivers is desirable.

SUMMARY OF THE INVENTION

The disclosed embodiments relate to reducing adjacent channel interference in an OFDM receiver. An error metric is monitored and the carrier frequency of the desired channel is slowly adjusted in response to the error metric. In this manner, the received OFDM signal, including the desired signal corrupted by the adjacent interfering channel, may be shifted until the zero crossings of the adjacent channel line up with the FFT bins. A multi-tap equalizer may then be used to remove the intentionally introduced inter-bin interference that results from the frequency offset in the desired channel.

DETAILED DESCRIPTION OF THE PREFERRED EMBODIMENT

The characteristics and advantages of the present invention will become more apparent from the following description, given by way of example.

Figure 1:
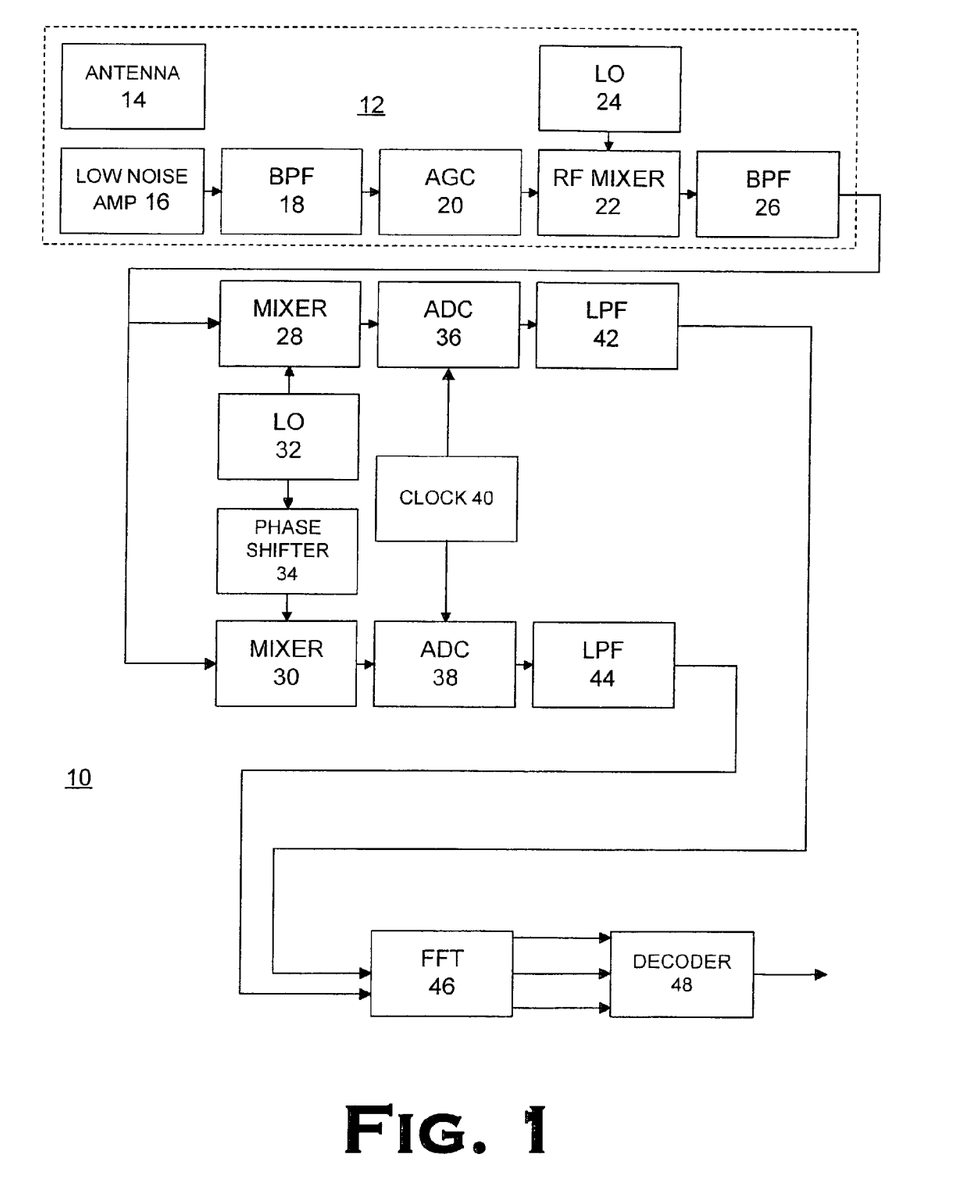
FIG. 1 is a block diagram of an exemplary OFDM receiver.

Referring to FIG. 1, the first element of a typical OFDM receiver 10 is an RF receiver 12. Many variations of the RF receiver 12 exist and are well known in the art, but typically, the RF receiver 12 includes an antenna 14, a low noise amplifier (LNA) 16, an RF band pass filter 18, an automatic gain control (AGC) circuit 20, an RF mixer 22, an RF carrier frequency local oscillator 24, and an IF band pass filter 26.

Through the antenna 14, the RF receiver 12 couples in the RF OFDM-modulated carrier after it passes through the channel. Then, by mixing it with a receiver carrier of frequency $f_{cr}$ generated by the RF local oscillator 24, the RF receiver 12 downconverts the RF OFDM-modulated carrier to obtain a received IF OFDM signal. The frequency difference between the receiver carrier and the transmitter carrier contributes to the carrier frequency offset, delta $f_c$.

This received IF OFDM signal is coupled to a mixer 28 and a mixer 30 to be mixed with an in-phase IF signal and a 90° phase-shifted (quadrature) IF signal, respectively, to produce in-phase and quadrature OFDM signals, respectively. The in-phase IF signal that feeds into the mixer 28 is produced by an IF local oscillator 32. The 90° phase-shifted IF signal that feeds into mixer 30 is derived from the in-phase IF signal of the IF local oscillator 32 by passing the in-phase IF signal through a 90° phase shifter 34 before providing it to the mixer 30.

The in-phase and quadrature OFDM signals then pass into analog-to-digital converters (ADCs) 36 and 38, respectively, where they are digitized at a sampling rate $f_{ck\_r}$ as determined by a clock circuit 40. The ADCs 36 and 38 produce digital samples that form an in-phase and a quadrature discrete-time OFDM signal, respectively. The difference between the sampling rates of the receiver and that of the transmitter is the sampling rate offset, delta $f_{ck} = f_{ck\_r} - f_{ck\_t}$.

The unfiltered in-phase and quadrature discrete-time OFDM signals from the ADCs 36 and 38 then pass through digital low-pass filters 42 and 44, respectively. The output of the low pass digital filters 42 and 44 are filtered in-phase and quadrature samples, respectively, of the received OFDM signal. In this way, the received OFDM signal is converted into in-phase ($q_i$) and quadrature ($p_i$) samples that represent the real and imaginary-valued components, respectively, of the complex-valued OFDM signal, $r_i = q_i + jp_i$. These in-phase and quadrature (real-valued and imaginary-valued) samples of the received OFDM signal are then delivered to an FFT 46. Note that in some conventional implementations of the receiver 10, the analog-to-digital conversion is done before the IF mixing process. In such an implementation, the mixing process involves the use of digital mixers and a digital frequency synthesizer. Also note that in many conventional implementations of receiver 10, the digital-to-analog conversion is performed after the filtering.

The FFT 46 performs the Fast Fourier Transform (FFT) of the received OFDM signal in order to recover the sequences of frequency-domain sub-symbols that were used to modulate the sub-carriers during each OFDM symbol interval. The FFT 46 then delivers these sequences of sub-symbols to a decoder 48.

The decoder 48 recovers the transmitted data bits from the sequences of frequency-domain sub-symbols that are delivered to it from the FFT 46. This recovery is performed by decoding the frequency-domain sub-symbols to obtain a stream of data bits which should ideally match the stream of data bits that were fed into the OFDM transmitter. This decoding process can include soft Viterbi decoding and/or Reed-Solomon decoding, for example, to recover the data from the block and/or convolutionally encoded sub-symbols.

Figure 2:
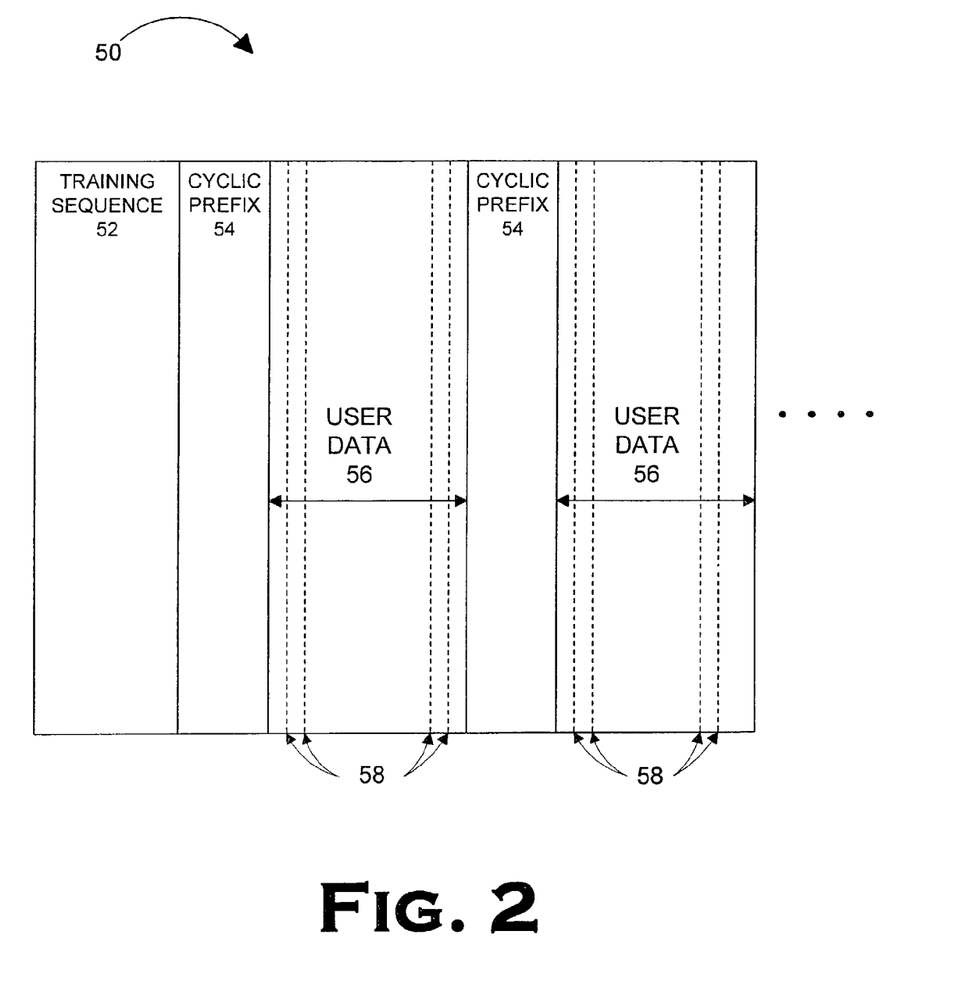
FIG. 2 is a diagram illustrating the placement of a training sequence, user data, and pilot signals within an OFDM symbol frame.

Turning to FIG. 2, an exemplary OFDM symbol frame 50 of the present invention is shown. The symbol frame 50 includes a training sequence or symbol 52 containing known transmission values for each sub-carrier in the OFDM symbol, and a predetermined number of a cyclic prefix 54 and user data 56 pairs. For example, the proposed ETSI-BRAN HIPERLAN/2 (Europe) and IEEE 802.11a (USA) wireless LAN standards, herein incorporated by reference, assign 64 known values or sub-symbols (i.e., 52 non-zero values and 12 zero values) to selected training symbols of a training sequence (e.g., "training symbol C" of the proposed ETSI standard and "long OFDM training symbol" of the proposed IEEE standard). The user data 56 has a predetermined number of pilots 58, also containing known transmission values, embedded on predetermined sub-carriers. For example, the proposed ETSI and IEEE standards have four pilots located at bins or sub-carriers ±7 and ±21. Although the present invention is described as operating in a receiver that conforms to the proposed ETSI-BRAN HIPERLAN/2 (Europe) and IEEE 802.11a (USA) wireless LAN standards, it is considered within the skill of one skilled in the art to implement the teachings of the present invention in other OFDM systems.

Figure 3:
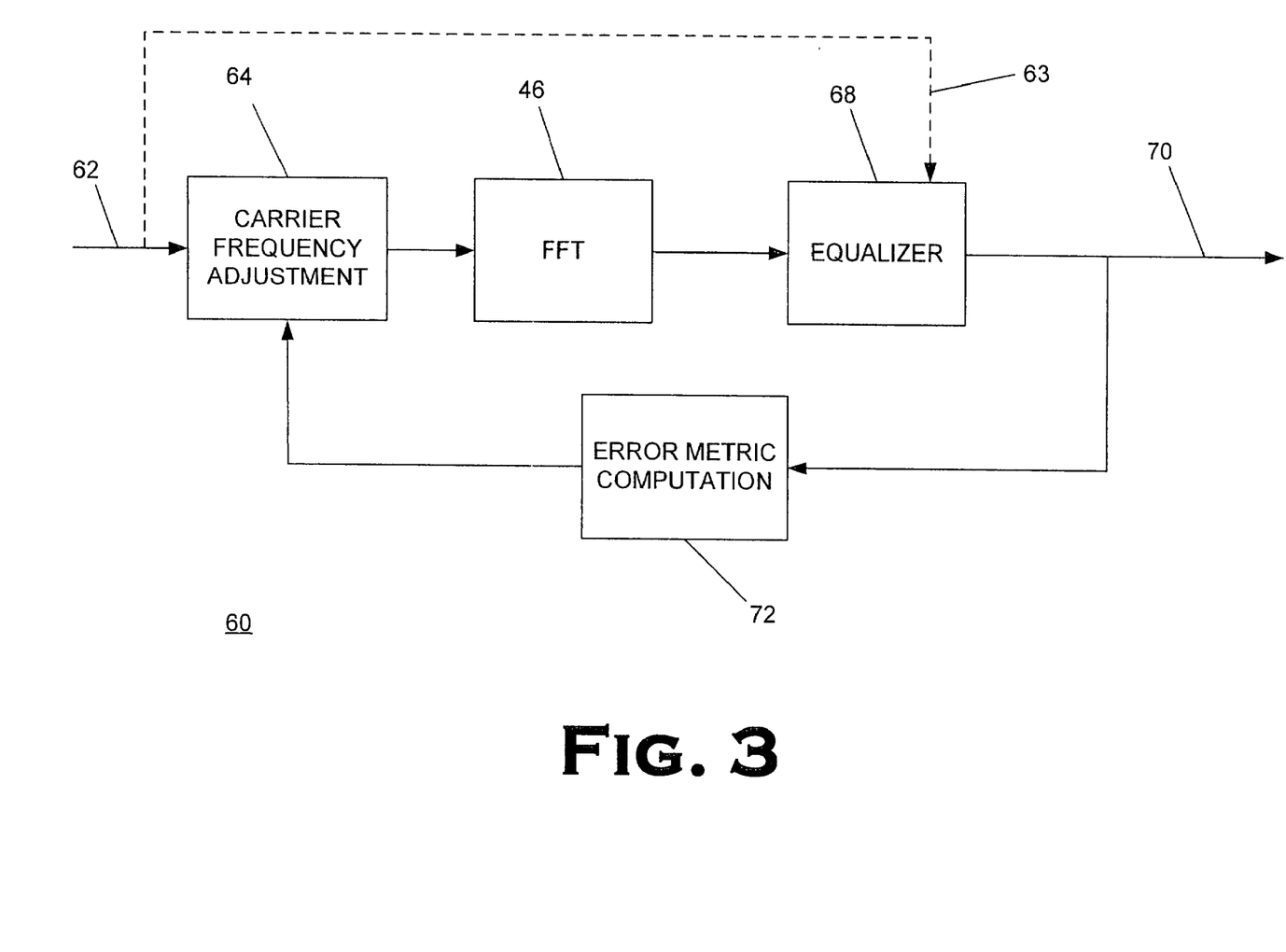
FIG. 3 is a block diagram of a circuit for reducing adjacent channel interference according to the present invention.

FIG. 3 is a block diagram of a circuit for reducing adjacent channel interference according to the present invention. The adjacent channel interference reducing circuit is referred to generally by the reference numeral 60. An input signal 62 is delivered to a carrier frequency adjustment module 64 before being processed by the FFT module 46. As explained below, the carrier frequency adjustment module 64 generates a frequency adjustment based on feedback from an error metric computation module 72.

The input signal 62 comprises the received OFDM signal which has been corrupted by tails of an adjacent channel interfering signal. In response to the output of the error metric computation module 72, the carrier frequency adjustment module 64 changes the frequency offset. This change in frequency offset has the effect of introducing interbin interference into the input signal 62. The rate of adjustment of the frequency offset must be sufficiently slower than the adaptation rate of an associated equalizer (described below with reference to FIG. 4) to give the associated equalizer time to converge. The frequency adjustment may be done in either an open loop or closed loop fashion.

The output of the carrier adjustment frequency module 64 is processed by the FFT module 46. The output of the FFT module 46 is delivered to an equalizer module 68. The output 70 of the equalizer module 68 is available for further processing. Also, the output 70 of the equalizer module 68 is delivered to the error metric computation module 72, the output of which in turn is delivered back to the carrier adjustment frequency module 64.

The error metric produced by the error metric computation module 72 is computed based on the equalized output of the FFT module 46. The error metric is proportional to the adjacent channel interference in the input signal 62 so the value of the error metric is minimized when the adjacent channel interference is at its minimum. One example of an error metric that may be used is the standard deviation of the steady state decision-directed least mean squares (LMS) error. That LMS error is defined as the difference between the equalizer output sample and the corresponding hard decision (output of a symbol decision device). The trained LMS error can also be used for systems that have pilot sub-carriers or sub-bands inserted in the data stream. Other error metrics may be used if the value of the error metric is proportional to the degree of adjacent channel interference in the input signal 62.

In systems where there are channels on either side of the desired channel, the removal of adjacent channel interference may be performed with respect to either channel. If there are two adjacent channels the adjacent channel interference may be minimized with respect to the stronger of the multiple adjacent channels.

Figure 4:
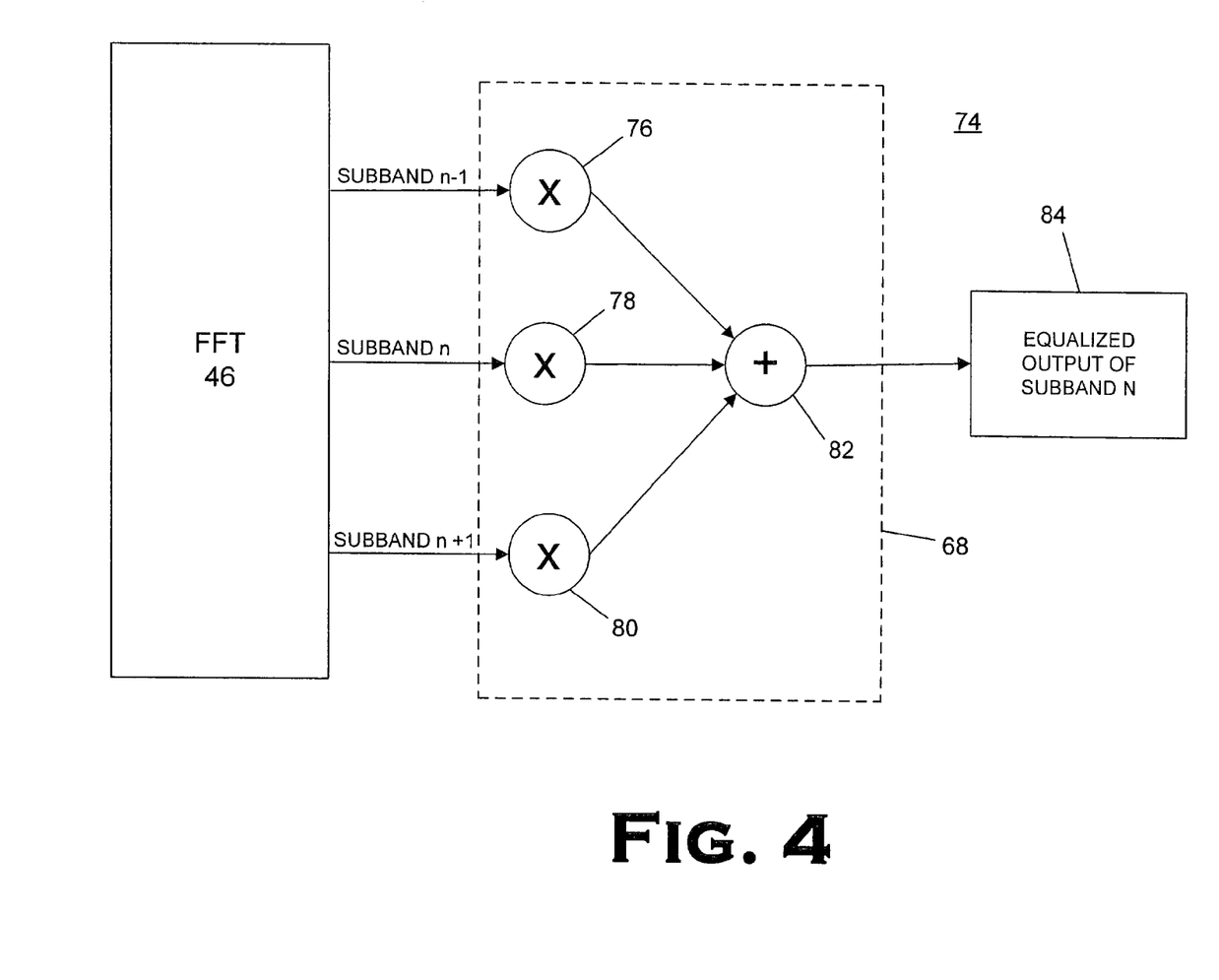
FIG. 4 is a block diagram of a multi-tap equalizer that may be used in conjunction with the present invention.

FIG. 4 is a block diagram of a multi-tap equalizer that may be used in conjunction with the present invention. The equalizer module 68 removes the interbin interference that was introduced by the carrier frequency adjustment module 64. The removal of the interbin interference results in a reduction in the adjacent channel interference associated with the signal. The output of the FFT module 46 is broken into three sub-bands: sub-band n, sub-band n−1 and sub-band n+1. The number of sub-bands may vary because of operational characteristics of a given application. The exact number of sub-bands into which the output of the FFT module 46 is broken is not a crucial aspect of the invention.

Each of the three sub-bands n, n−1 and n+1 are delivered to separate multiplier circuits where they are multiplied by corresponding equalizer coefficients. The coefficients for the equalizers may be chosen based on the known carrier frequency offset. The specific method of determining the coefficients is not a crucial aspect of the present invention. The sub-bands n−1, n and n+1 are delivered respectively to multipliers 76, 78 and 80. One method of obtaining sub-band values may be to derive those values from the input signal 62, as indicated by the dashed line 63.

The output of the multipliers 76, 78 and 80 is delivered to a summing circuit 82, which delivers an equalized output 84 for sub-band n. The multipliers 76, 78, 80 and the summing circuit 82 comprise the equalizer module 68.

As set forth above, the multi-tap equalizer 68 cancels out interbin interference that is introduced by the carrier frequency offset from the carrier frequency adjustment module 64. Although the intentional introduction of the frequency offset provided by the carrier frequency adjustment module may reduce the interference of the adjacent channel, the offset may also induce undesired interbin interference in the input signal because the sub-bands of the desired channel are no longer aligned with the FFT bins. The multi-tap equalizer 68 removes this interbin interference to achieve a reduction in adjacent channel interference.

Figure 5:
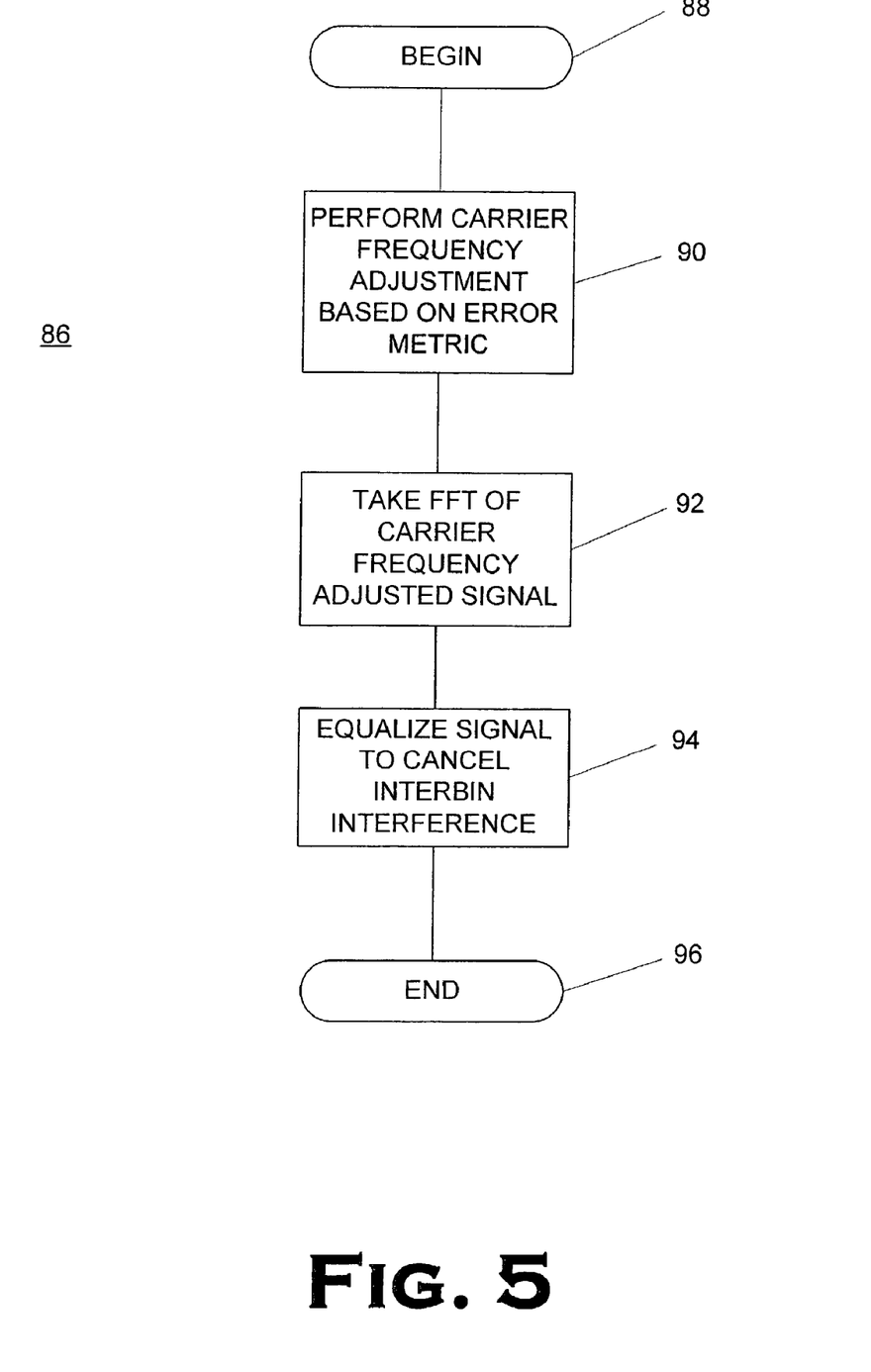
FIG. 5 is a process flow diagram illustrating the operation of an exemplary embodiment of the present invention.

FIG. 5 is a process flow diagram illustrating the operation of an exemplary embodiment of the present invention. The process is generally referred to by the reference numeral 86. Those of ordinary skill in the field will appreciate that the functions and operations illustrated in FIG. 5 may be accomplished using circuitry (hardware), software or combinations of hardware and software.

At 88, the process begins. At 90, a carrier frequency is performed based on an error metric. Computation of the error metric may be performed as described above with reference to FIG. 3. After adjusting the input signal by the frequency offset that has been changed based on the output of the error metric computation module, the FFT of the signal is taken at 92.

The signal resulting from the FFT operation is equalized using a multi-tap equalizer as described with reference to FIG. 4. Thus, the input signal 62 has been processed to reduce the adjacent channel interference by the carrier frequency adjustment module 64. The self-induced interbin interference has been removed by the equalizer module 68. At 96, the process ends.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for reducing adjacent channel interference in a receiver that is adapted to receive a plurality of channels, each of the plurality of channels being adapted to receive an input signal, the method comprising the acts of:
    generating an error metric;
    creating an adjusted input signal by introducing interbin interference in one of the input signals responsive to the error metric;
    performing a Fast Fourier Transform (FFT) on the adjusted input signal to create an FFT-transformed adjusted input signal; and
    equalizing the FFT-transformed adjusted input signal to cancel the interbin interference from the FFT-transformed adjusted input signal.

2. The method of claim 1 wherein the act of creating an adjusted input signal comprises performing a carrier frequency adjustment on the input signal.

3. The method of claim 1 wherein the equalizing of the FFT-transformed adjusted input signal is performed by a multi-tap equalizer.

4. The method of claim 1 wherein the error metric is proportional to a degree of adjacent channel interference in the input signal.

5. The method of claim 4 wherein the error metric is derived from a standard deviation of a decision-directed least mean squares (LMS) error.

6. The method of claim 1 wherein the input signal is an Orthogonal Frequency Division Multiplexed (OFDM) signal.

7. The method of claim 1 wherein the recited acts are performed in the recited order.

8. A device that reduces adjacent channel interference in a receiver that is adapted to receive a plurality of channels, each of the plurality of channels being adapted to receive an input signal, the device comprising:
    circuitry that generates an error metric;
    circuitry that creates an adjusted input signal by introducing interbin interference in one of the input signals responsive to the error metric;
    circuitry that performs a Fast Fourier Transform (FFT) on the adjusted input signal to create an FFT-transformed adjusted input signal; and
    circuitry that equalizes the FFT-transformed adjusted input signal to cancel the interbin interference from the FFT-transformed adjusted input signal.

9. The device of claim 8 wherein the circuitry that creates an adjusted input signal comprises circuitry that performs a carrier frequency adjustment on the input signal.

10. The device of claim 8 wherein the circuitry that equalizes the FFT-transformed adjusted input signal comprises a multi-tap equalizer.

11. The device of claim 8 wherein the error metric is proportional to a degree of adjacent channel interference in the input signal.

12. The device of claim 11 wherein the error metric is derived from a standard deviation of a decision-directed least mean squares (LMS) error.

13. An Orthogonal Frequency Division Multiplexing (OFDM) receiver that reduces adjacent channel interference, the OFDM receiver being adapted to receive a plurality of channels, each of the plurality of channels being adapted to receive an OFDM input signal, the OFDM receiver comprising:
    circuitry that is adapted to receive OFDM input signals on a plurality of channels;
    circuitry that generates an error metric;
    circuitry that creates an adjusted OFDM input signal by introducing interbin interference in one of the OFDM input signals responsive to the error metric;
    circuitry that performs a Fast Fourier Transform (FFT) on the adjusted OFDM input signal to create an FFT-transformed adjusted OFDM input signal; and circuitry that that equalizes the FFT-transformed adjusted input signal to cancel the interbin interference from the FFT-transformed adjusted OFDM input signal.

14. The Orthogonal Frequency Division Multiplexing (OFDM) receiver of claim 13 wherein the circuitry that creates an adjusted input signal comprises circuitry that performs a carrier frequency adjustment on the input signal.

15. The Orthogonal Frequency Division Multiplexing (OFDM) receiver of claim 13 wherein the circuitry that equalizes the FFT-transformed adjusted input signal comprises a multi-tap equalizer.

16. The Orthogonal Frequency Division Multiplexing (OFDM) receiver of claim 13 wherein the error metric is proportional to a degree of adjacent channel interference in the input signal.

17. The Orthogonal Frequency Division Multiplexing (OFDM) receiver of claim 16 wherein the error metric is derived from a standard deviation of a decision-directed least mean squares (LMS) error.

18. A method for reducing adjacent channel interference in a receiver that is adapted to receive a plurality of channels, each of the plurality of channels being adapted to receive an input signal, the method comprising the acts of:
   generating an error metric that is proportional to a degree of adjacent channel interference in the input signal;
   creating an adjusted input signal by introducing interbin interference in one of the input signals responsive to the error metric;
   performing a Fast Fourier Transform (FFT) on the adjusted input signal to create an FFT-transformed adjusted input signal; and
   canceling the interbin interference from the FFT-transformed adjusted input signal.

19. A device that reduces adjacent channel interference in a receiver that is adapted to receive a plurality of channels, each of the plurality of channels being adapted to receive an input signal, the device comprising:
   circuitry that generates an error metric that is proportional to a degree of adjacent channel interference in the input signal;
   circuitry that creates an adjusted input signal by introducing interbin interference in one of the input signals responsive to the error metric;
   circuitry that performs a Fast Fourier Transform (FFT) on the adjusted input signal to create an FFT-transformed adjusted input signal; and
   circuitry that cancels the interbin interference from the FFT-transformed adjusted input signal.

20. An Orthogonal Frequency Division Multiplexing (OFDM) receiver that reduces adjacent channel interference, the OFDM receiver being adapted to receive a plurality of channels, each of the plurality of channels being adapted to receive an OFDM input signal, the OFDM receiver comprising:
   circuitry that is adapted to receive OFDM input signals on a plurality of channels;
   circuitry that generates an error metric that is proportional to a degree of adjacent channel interference in the input signal;
   circuitry that creates an adjusted OFDM input signal by introducing interbin interference in one of the OFDM input signals responsive to the error metric;
   circuitry that performs a Fast Fourier Transform (FFT) on the adjusted OFDM input signal to create an FFT-transformed adjusted OFDM input signal; and
   circuitry that cancels the interbin interference from the FFT-transformed adjusted OFDM input signal.

* * * * *